(12) United States Patent
Adkins et al.

(10) Patent No.: US 8,401,995 B2
(45) Date of Patent: Mar. 19, 2013

(54) FILE REMOVAL WITH NO AVAILABLE DISK BLOCKS IN REDIRECT-ON-WRITE FILE SYSTEMS

(75) Inventors: Janet E. Adkins, Austin, TX (US); David J. Craft, Wimberly, TX (US); Andrew N. Solomon, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 12/879,834

(22) Filed: Sep. 10, 2010

(65) Prior Publication Data

US 2012/0066181 A1 Mar. 15, 2012

(51) Int. Cl.
G06F 7/00 (2006.01)
G06F 17/00 (2006.01)

(52) U.S. Cl. ........................................ 707/639; 707/682

(58) Field of Classification Search .................. 707/625, 707/639, 640, 648, 657, 672, 682; 711/161, 711/162; 714/15, 20
See application file for complete search history.

(56) References Cited

U.S. PATENT DOCUMENTS

| 7,392,324 B2 * | 6/2008 | Cardone et al. ............... 709/238 |
| 2006/0036676 A1 * | 2/2006 | Cardone et al. ............... 709/203 |
| 2007/0220059 A1 * | 9/2007 | Lu et al. ........................ 707/200 |

OTHER PUBLICATIONS

Stender., Efficient Management of Consistent Backups in a Distributed File System, 2009, IEEE, 656-659.*

Garimella, Neeta , "Understanding and exploiting snapshot technology for data protection, Part 1: Snapshot technology overview", Neeta Garimella (neeta@us.ibm.com), *TSM Client Developer, Tivoli—Software Group, IBM* Obtained from Internet on Nov. 15, 2010. http://www.ibm.com/developerworks/tivoli/library/t-snaptsml/index.html , 1 page.

Shah, Bhavana , "Disk Performance of Copy-On-Write Snapshot Logical Volumes", *B.E., Indian Institute of Technology Roorkee*, India Master of Science in The Faculty of Graduate Studies (Computer Science), The University of British Columbia Aug. 2006, Bhavana Shah 2006 Obtained from Internet on Nov. 15, 2010. http://www.cs.ubc.ca/grads/resources/thesis/Nov06/Bhavana.pdf 1999 , 83 pages.

Garimella, Neeta , "Understanding and exploiting snapshot technology for data protection, Part 1: Snapshot technology overview", *TSM Client Developer, Tivoli—Software Group, IBM* http://www.ibm.com/developerworks/tivoli/library/t-snaptsm1/index.html Obtained from internet on Sep. 6, 2010. Apr. 26, 2006 , 9 pages.

Shah, Bhavana , "Disk Performance of Copy-On-Write Snapshot Logical Volumes", *B.E., Indian Institute of Technology Roorkee*, India , 1999 The University of British Columbia ,Aug. 2006 http://www.cs.ubc.ca/grads/resources/thesis/Nov06/Bhavana.pdf Obtained from Internet on Sep. 6, 2010. Aug. 2006 , 83 pages.

* cited by examiner

*Primary Examiner* — Jean B Fleurantin
(74) *Attorney, Agent, or Firm* — DeLizio Gilliam, PLLC

(57) ABSTRACT

Embodiments include a method for removing a file within a redirect-on-write file system. In some embodiments, a file removal operation is detected in a file management unit, which resides in a memory unit. It is then determined that the number of free data blocks in the persistent storage is below a minimum threshold. The file removal operation is written to a log used for storing system operations. A file management unit is notified of the successful write of the file removal operation to the log used for storing system operations. The data blocks are moved from the file selected for removal to a list of free data blocks. The indirect blocks from the file selected for removal are moved to a data block removal list.

6 Claims, 4 Drawing Sheets

FILE REMOVAL WITH NO AVAILABLE DISK BLOCKS IN REDIRECT-ON-WRITE FILE SYSTEMS

TECHNICAL FIELD

Embodiments of the inventive subject matter generally relate to the field of operating systems and, more particularly, to removing files in redirect-on-write file systems.

BACKGROUND

Operating systems are a basic component in most computer systems. Operating systems include file systems, which organize and store data within main memory and on disk (or other persistent storage). An operating system manages data in the file system with various system operations, such as operations which read and write the data in the file system. In many operating systems, storage space in the file system can be made available by removing files or data, whenever necessary. However, redirect-on-write file systems remove data differently, as they perform special operations for freeing data when free memory and disk space is limited. Without the ability to remove files or data from a file system, some computer systems may be unable to process incoming file system operations or store more data or files persistently on disk.

SUMMARY

Embodiments include a method for removing a file within a redirect-on-write file system. In some embodiments, a file removal operation is detected in a file management unit, which resides in a memory unit. It is then determined that the number of free data blocks in the persistent storage is below a minimum threshold. The file removal operation is written to a log used for storing system operations. A file management unit is notified of the successful write of the file removal operation to the log used for storing system operations. The data blocks are moved from the file selected for removal to a list of free data blocks. The indirect blocks from the file selected for removal are moved to a data block removal list.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
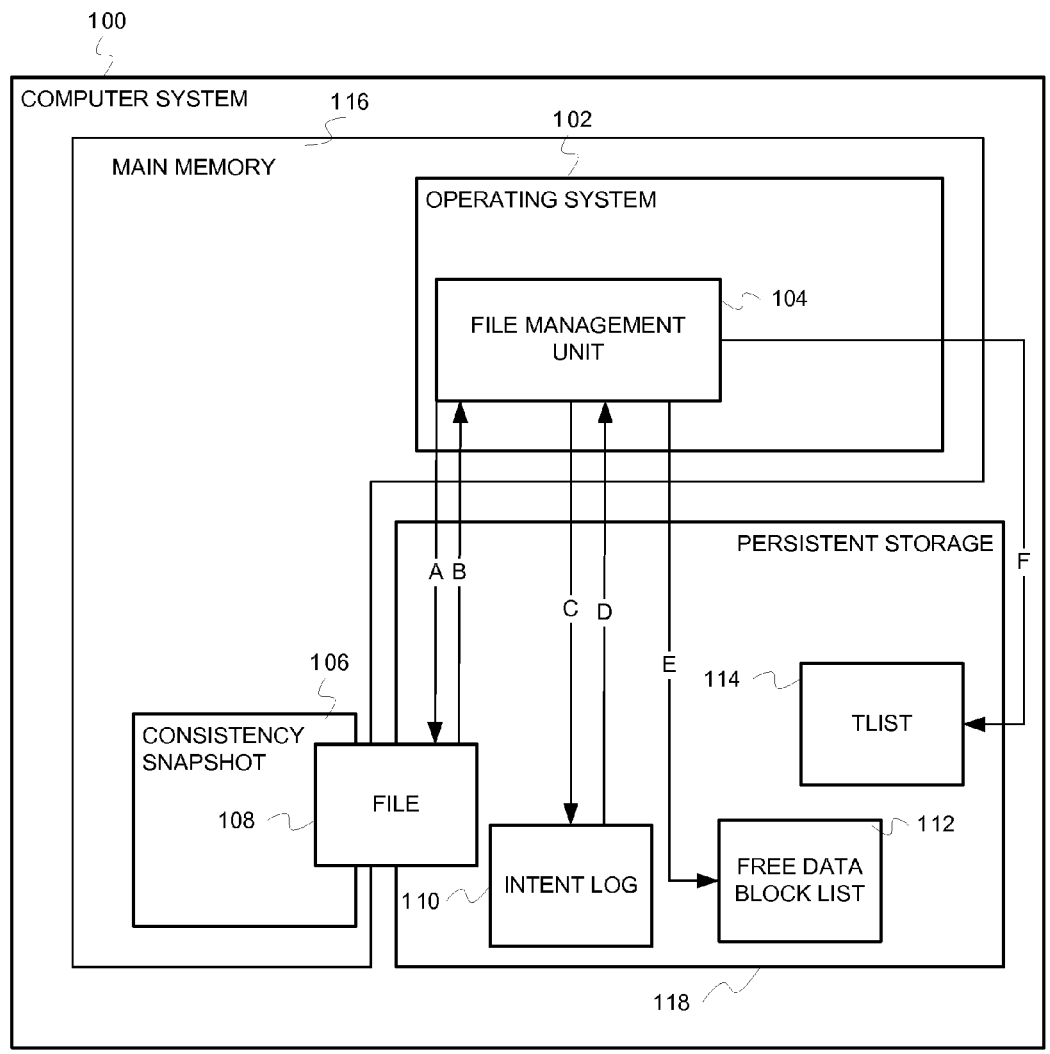
FIG. 1 is an example conceptual diagram illustrating operations for removing a file in a redirect-on-write operating system, according to some embodiments.

The description that follows includes exemplary systems, methods, techniques, instruction sequences and computer program products that embody techniques of the present inventive subject matter. However, the embodiments may be practiced without these specific details. For instance, although examples refer to removing files in an IBM® Advanced Interactive Executive (AIX®) operating system, in other embodiments, operations described herein can also be implemented for removing files in any suitable operating system. In other implementations, well-known instruction instances, protocols, structures and techniques have not been shown in detail in order to avoid obfuscating the description.

Introduction

This section provides an introduction to concepts utilized in some embodiments of the inventive subject matter.

Some operating systems store and organize their data in file systems. These file systems may store and organize data and files using different methods and data structures. The data in the file systems can be stored in persistent storage (e.g., on magnetic disk). Data in persistent storage can be referred to as an original volume.

Some operating systems ensure data redundancy and minimize the impact of system crashes by utilizing certain data consistency methods in their file systems. Data consistency is the concept that data should be valid and accurate. If a computer system loses power, crashes, or fails, data consistency prevents the data from becoming unrecoverable or corrupted.

Operating systems can maintain data consistency using consistency snapshots. A consistency snapshot (also referred to herein as a "snapshot") is a record of a file system's state at a given moment in time. Upon creation, snapshots are stored in main memory, but later, they are written to persistent storage. Because snapshots are eventually stored in persistent storage (e.g., on magnetic disk), operating system components can use snapshots as a guide for restoring file systems after components fail (e.g., a loss of power).

Some embodiments of the inventive subject matter include operating systems that employ redirect-on-write file systems. In some embodiments, the redirect-on-write file system's original volume contains data present when a snapshot is taken. The file system can also store, in a snapshot storage area in main memory, modifications to the original volume, where the modifications occurred since the snapshot was taken. Consequently, in some embodiments, redirect-on-write file systems redirect new write operations affecting the original volume to the snapshot's storage area in main memory. For example, if an application program wants to modify an existing file by writing new data to the file, the file system records the new data in the snapshot's storage area in main memory.

In some embodiments, the redirect-on-write file system includes a file management unit that manages the flow of data between the snapshot storage area of main memory and persistent storage. Periodically, the file management unit can determine that the data from the snapshot storage should be reconciled back into the original volume (this process is also referred to herein as "flushing the snapshot" to persistent storage). After reconciling the snapshot back into the original volume, the original volume is up-to-date, and the file management unit can then create another snapshot. As successive snapshots are created, access to the original data, tracking of the data in the snapshots and the original volume, and reconciliation upon snapshot deletion are further complicated. As these issues grow in complexity with each successive snapshot, the file management unit can track and reconcile the data modifications in the snapshot and the original volume.

There are relationships between consecutive snapshots in redirect-on-write file systems. As discussed above, a new snapshot is captured in main memory after the previous snapshot is written to persistent storage. At this point in time, the original volume is up-to-date, so the data in the original volume represents the current state of the file system.

The persistent storage area can store data in data blocks. These data blocks can be connected in structures called i-nodes, which can store basic information about files and directories. The data blocks can be connected in a tree structure, with the top data block referred to as a disk i-node block. The disk i-node block can be connected with up to sixteen indirect blocks below. The indirect blocks can also be connected with up to sixteen indirect blocks below or up to sixteen data blocks. The data blocks can store data, while the indirect blocks provide access to the data blocks. The hierarchical structure of the indirect blocks and data blocks form files and directories. The file structure is further described in FIG. 2. After the file management unit reconciles the current snapshot into the original volume (in persistent storage), data blocks that are freed after writing the consistency snapshot become available, so the next snapshot can utilize the free data blocks in persistent storage.

In some instances, removing data or files operates differently in redirect-on-write file systems than with other file systems. With other file systems, data or files can typically be removed freely without regard for remaining disk space in storage. However, with redirect-on-write file systems, a limited amount of free data blocks in persistent storage can be problematic (e.g., because file removal operations consume free data blocks in persistent storage). When the persistent storage does not have enough free data blocks to complete system calls, such as file removal or write operations, the system calls will fail. In order to avoid this situation, the system can provide an indicator when there are no free data blocks in persistent storage or when the number of free data blocks in the persistent storage is low. If such an indicator is detected, some embodiments can take measures to free-up data block in persistent storage, so file operations can execute without failure and without delay.

Handling File Removal Operations

FIG. 1 is a conceptual diagram illustrating example operations for removing a file in a redirect-on-write operating system, according to some embodiments. FIG. 1 depicts a computer system 100, which includes persistent storage 118 and main memory 116. In some embodiments, main memory 116 includes a consistency snapshot 106 and an operating system 102. The consistency snapshot 106 can include a portion of the data for a file 108 located in persistent storage 118. However, the file 108 can have data in both persistent storage 118 and the consistency snapshot 106. The operating system 102 includes a file management unit 104. The operating system 102 includes a file management unit 104, which in some embodiments manages both data and file removal. Although the operating system 102 appears in the main memory 116, portions of the operating system 102 can reside in the persistent storage 118. Similarly, in some embodiments, components depicted in the persistent storage 118 may reside in main memory (all, in part, or as a copy).

The persistent storage 118 includes a data block removal list 114 (also referred to herein as a "tlist"), an intent log 110, a free data block list 112, and either all or a portion of the data in a file 108. The data blocks in the free data blocks list 112 can be utilized for data storage during the current snapshot. However, the data blocks within the data block removal list 114 cannot be utilized for data storage until the current snapshot is flushed to persistent storage.

The intent log 110 can store file system operations, such as file removal or write operations, that the file management unit 104 receives after the previous snapshot is flushed to persistent storage. Flushing the snapshot to the original volume (persistent storage) occurs frequently, which allows for relatively short intent logs. In the event of a system crash, the intent log can replicate the system calls that occurred after the last snapshot was flushed to persistent storage.

Figure 2A:
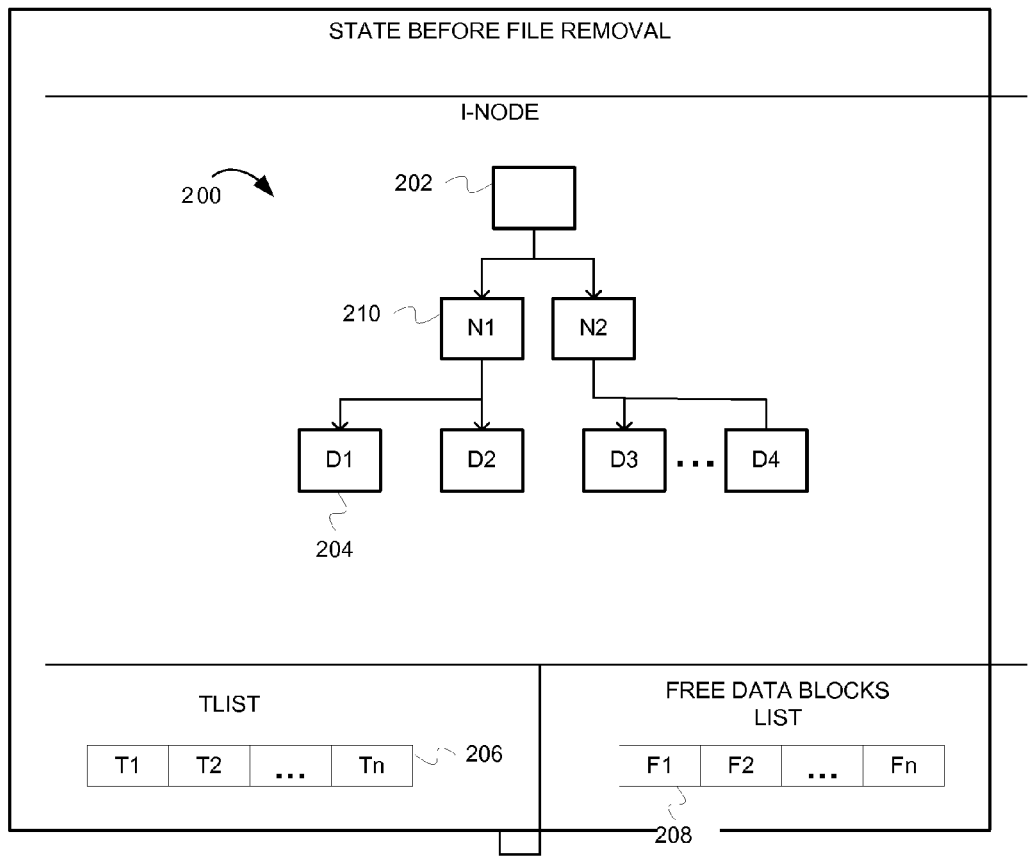
FIGS. 2A & 2B depict state diagrams, which illustrate examples of the contents of the file structures involved in removing a file in a redirect-on-write file system, according to some embodiments.
Figure 2B:
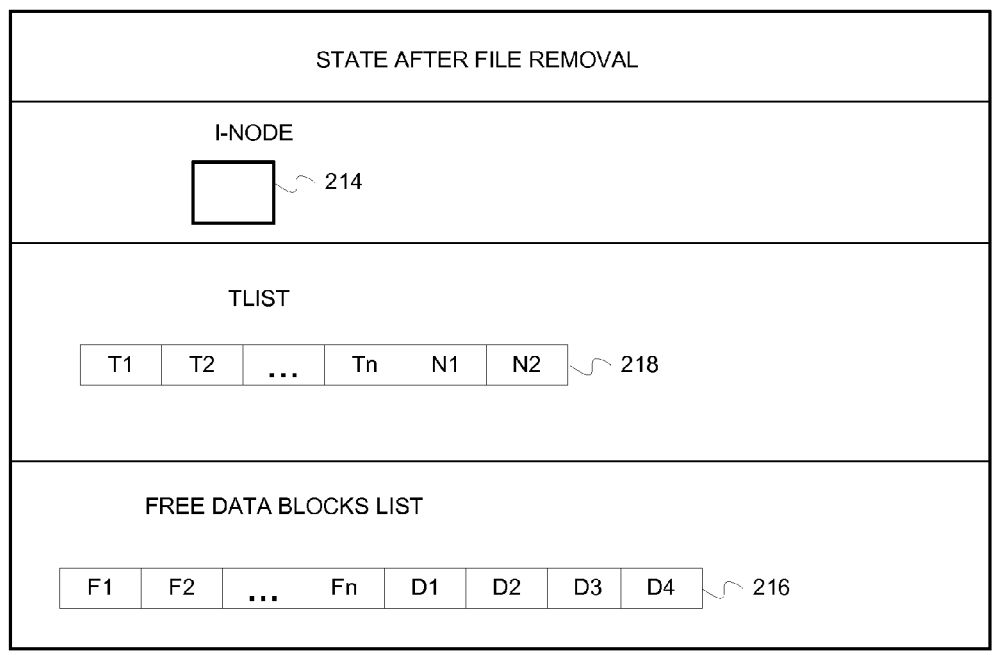

FIG. 1 shows file removal operations in stages A-E. During stage A, the file management unit 104 detects a file removal operation and searches for a file 108. The file's data 108 could be located in the consistency snapshot 106, or the persistent storage 118. The file management unit 104 may detect a file removal operation from an application or command line operation. Next (stage B), the file management unit 104 retrieves portions of the file from the persistent storage 118. FIGS. 2A & 2B show an example of the state of various memory components before the file removal operation is executed. In turn (stage C), the file management unit 104 sends the file removal operation to the intent log 110. In some implementations, the file management unit 104 then receives notification of a successful write of the file removal operation in the intent log 110 (stage D). If the number of available free data blocks in the persistent storage 118 is below a minimum threshold and the file removal operation was successfully written to the intent log 110, then the file management unit can move data blocks within the file (i.e., the file selected for removal) to the free block list 112 and the indirect blocks within the file to the tlist 114. FIGS. 2A & 2B show an example state of the memory components after a file removal operation is executed.

FIG. 2A includes a state diagram which illustrates an examples file system state. In FIG. 2A, an i-node includes a series of indirect blocks 210 and data blocks 204 connected to a disk i-node block 202 in a hierarchical manner. The disk i-node block 202 is the head of data tree 200, which stores all of the data. In some embodiments, the disk i-node block contains up to sixteen pointers to indirect blocks 210 below. Each indirect block 210 can also contain up to sixteen pointers to data blocks 204 below. All of the data can be stored in data blocks 204 at the bottom level of the data tree, while the in data blocks 210 can contain the pathway information necessary to access the data blocks 204. In some instances, there are indirect blocks 210 in the i-node which connect to other indirect blocks 210. This allows for the file structure to contain more data blocks, thereby increasing the amount of data which can be stored within a single file structure.

The free data blocks list 208 contains all available data blocks that can be used for data storage by any application or file within the current snapshot. The tlist 206 contains a list of data blocks, which will become free data blocks after the current snapshot is flushed to persistent storage.

The state of the file system before a file removal operation is illustrated in FIG. 2A. The i-node can include a disk i-node block 202, indirect blocks 210, and data blocks 204. In some embodiments, the tlist 206 includes a list of data blocks that have been freed in the current snapshot, but cannot be used again for data storage until the current snapshot is flushed to persistent storage. The free data blocks list 208 includes a list of data blocks, some of which have been freed in the current snapshot. Blocks in the free data blocks list 208 can be used for data storage in the current snapshot.

FIG. 2B illustrates an instance in which a file removal operation has occurred, according to some embodiments. The data blocks 204 and indirect blocks 210 have been removed from the i-node 202 and placed in either the free data blocks list 216 or the tlist 218. In some embodiments, for file removal operations occurring while the persistent storage contains a number of free data blocks below a minimum threshold (e.g., there are no free data blocks), the file management unit places the "removed" file's data blocks 204 in the free data blocks list 216—before flushing the current consistency snapshot to persistent storage. Data blocks do not store data that may be needed to reconstruct files if the system were to unexpectedly crash. Instead, data blocks store data for application programs and other processes in the computer system. Because the file management unit places the data blocks on the free data blocks list 216 before flushing the consistency snapshot, those blocks can be used immediately for storing data associated with file operations (e.g., file removal operations). Thus, the operating system may avoid file-removal-related stalls arising from low free space in persistent storage. The file management unit can also place the indirect blocks in the tlist 218 whenever the file removal operation occurs, regardless of the number of free data blocks available in the persistent storage. All of the data blocks in the tlist will be considered free data blocks after the file management unit flushes the current consistency snapshot to persistent storage.

This discussion continues with more operations for removing files in a redirect-on-write file system.

Figure 3:
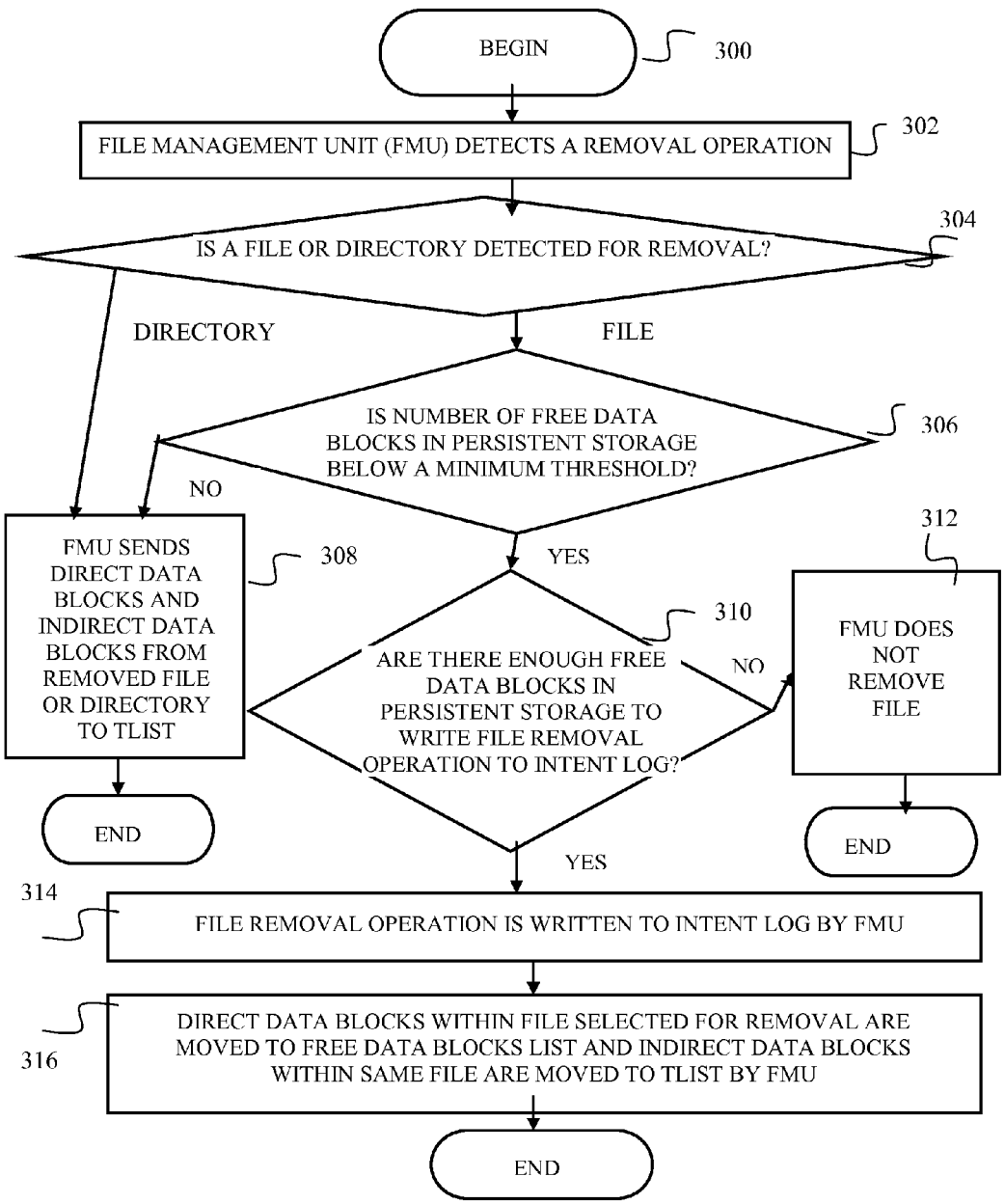
FIG. 3 depicts a flow diagram illustrating example operations for removing a file or directory in a redirect-on-write operating system, according to some embodiments.

FIG. 3 depicts a flow diagram illustrating example operations for removing files or directories, according to some embodiments. The flow begins at block 302 in FIG. 3.

The file management unit detects a removal operation (302). The file management unit may detect a removal operation from an application or command line operation. The file management unit can then determine if the removal operation targets a file or a directory (304). If the file management unit determines that the removal operation targets a directory, then the data blocks and indirect blocks associated with the directory can be moved from the directory location to the tlist (308).

If the file management unit determines that the removal operation targets a file (at 304), then the file management unit can determine whether the number of available data blocks in the persistent storage is below a minimum threshold (306). If the number of available data blocks is greater than the minimum threshold (at 306), then the file management unit places data blocks and indirect blocks from the file selected for removal in the tlist (308). As described above, data blocks on the tlist will not be added back to the free list of data blocks until the current snapshot is flushed to persistent storage. Thus, those tlist blocks will not be available for use in servicing other file operating occurring during the current snapshot cycle.

If the number of available data blocks in persistent storage is less than a minimum threshold (at 304), then the file management unit determines whether there is available disk space in persistent storage to write the file removal operation to the intent log (310). If there is not sufficient free disk space in persistent storage to write the file removal operation to the intent log, then the file removal fails (i.e., the file management unit does not remove the file) (312). If there is adequate free space in persistent storage to write the file removal operation to the intent log (at 310), then the file management unit writes the file removal operation to the intent log (314). The file management unit can then move the data blocks within the file selected for removal to the free data blocks list (316). The file management unit can also move the indirect blocks to the tlist 316. In the example shown in FIG. 2B, at this point in time, the file structure will be empty.

It should be understood that FIGS. 1-4 are examples meant to aid in understanding embodiments and should not be used to limit embodiments or limit scope of the claims. Embodiments may perform additional operations, fewer operations, operations in a different order, operations in parallel, and some operations differently. For instance, according to FIG. 3, the file management unit determines whether a removal operation targets a directory or file 304 before determining whether the persistent storage has a number of free data blocks which is below a minimum threshold 306. Some embodiments may determine whether the persistent storage has a number of free data blocks which is below a minimum threshold 306 before the file management unit determines whether a removal operation targets a directory or file 304.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
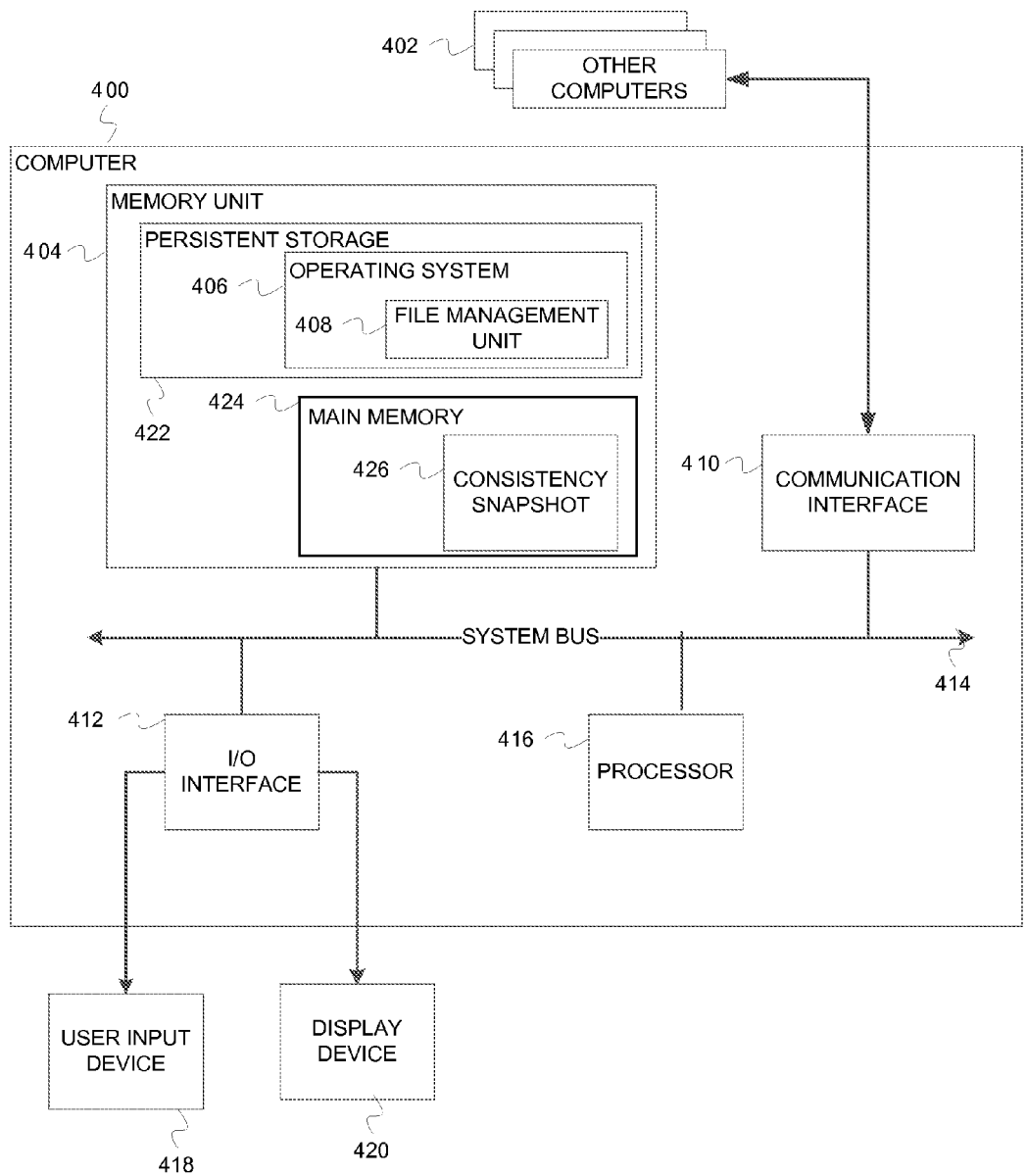
FIG. 4 is a block diagram of one embodiment of a computer system, according to some embodiments.

FIG. 4 depicts an example computer system. A computer system includes a processor unit 416 (possibly including multiple processors, multiple cores, multiple nodes, and/or implementing multi-threading, etc.). The computer system also includes a memory unit 404. The memory unit 404 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 414 (e.g., PCI, ISA, PCI-Express, HyperTransport®, Infini-Band®, NuBus, etc.), a communication interface 410 (e.g., an ATM interface, an Ethernet interface, a Frame Relay interface, SONET interface, wireless interface, etc.), and an I/O (input/output) interface 412. The communication interface allows the computer 400 to communicate (e.g., send and receive data) with other computers 402. Input/output interface adapters in computers can implement user-oriented input/output through, for example, software drivers and computer hardware. The I/O interface may utilize various display devices 420, such as computer display screens, and various user input devices 418, such as keyboards and mice.

In some embodiments, the memory unit 404 includes main memory 424, which can include a consistency snapshot 426. As discussed above, in some embodiments, the consistency snapshot 426 includes data for files located in persistent storage 422. The memory unit 404 also includes an operating system. In some embodiments, there is a file management unit 408 included in the operating system 406. The file management unit 408 embodies functionality to implement the operations described above. The file management unit 408 may include one or more functionalities that facilitate the removal of files in redirect-on-write file systems. In some embodiments, the file management unit 408 detects a file removal operation. Then, the file management unit 408 can determine that the number of available data blocks in persistent storage 422 is below a minimum threshold. As discussed above, the file management unit 408 can then remove the file.

Any one of these functionalities may be partially (or entirely) implemented in hardware and/or on the processing unit 416. For example, the functionality may be implemented with an application specific integrated circuit, in logic implemented in the processing unit 416, in a co-processor on a peripheral device or card, etc. Further, realizations may include fewer or additional components not illustrated in FIG. 4 (e.g., video cards, audio cards, additional network interfaces, peripheral devices, etc.). The processor unit 416, the I/O interface 412, and the communication interface 410 are coupled to the system bus 414. Although illustrated as being coupled to the system bus 414, the memory unit 404 may be coupled to the processor unit 416.

While the embodiments are described with reference to various implementations and exploitations, it will be understood that these embodiments are illustrative and that the scope of the inventive subject matter is not limited to them. In general, techniques for removing files in a redirect-on-write file system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for removing a file within a redirect-on-write file system, the computer program product comprising:

a computer readable storage medium having computer usable program code embodied therewith, the computer readable program code configured to, detect, in a file management unit residing in a memory unit, a file removal operation, wherein a portion of the file is part of a consistency snapshot residing in a main memory, and wherein a portion of the file resides in persistent storage;

detect, in the file management unit, a number of free data block in the persistent storage is below a minimum threshold;

detect, in the file management unit, the file removal operation was successfully written in a log for storing system operations;

move a plurality of data blocks from the file selected for removal to a list of free data blocks, wherein the list of free data blocks identifies available data blocks in the persistent storage;

move a plurality of indirect blocks from the file selected for removal to a data block removal list, wherein the data block removal list identifies data blocks in persistent storage that will be available after the consistency snapshot is written to the persistent storage; and utilize, in the memory unit, a plurality of indirect blocks, wherein said indirect blocks contain a plurality of data for the file and the indirect blocks are indirectly connected to a file structure.

2. The computer program product of claim 1, wherein the computer readable program code is further configured to:

detect, in the file management unit residing in the memory unit, a directory removal operation;

move a plurality of data blocks within a directory to the data block removal list; and move a plurality of indirect blocks within said directory to the data removal list.

3. The computer program product of claim 1, wherein the computer readable program code is further configured to:

detect, in the file management unit, the file removal operation was not successfully written in the log for storing system operations; and removal of the file referenced in the file removal operation does not occur.

4. The computer program product of claim 1, wherein the computer readable program code is further configured to:

detect, in the file management unit, the number of free data blocks in the persistent storage is not below a minimum threshold;

move the plurality of data blocks within the file to a data block removal list; and move the plurality of indirect blocks within the file to the data block removal list.

5. The computer program product of claim 1, wherein the computer readable program code is further configured to:

utilize, in the memory unit, a plurality of data blocks, wherein said data blocks contain a plurality of data for said file and the data blocks are directly connected to a file structure.

6. The computer program product of claim 1, wherein the computer readable program code is further configured to:

utilize, in the memory unit, a plurality of free data blocks, wherein said free data blocks are available to store a plurality of data for the redirect on write file system.

\* \* \* \* \*